United States Patent Office 3,346,576
Patented Oct. 10, 1967

3,346,576
WATER-SOLUBLE TRIAZINYL HEMIESTERS
Gustav Steinbrunn, Schwegenheim, Pfalz, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Jan. 11, 1965, Ser. No. 424,828
Claims priority, application Germany, Jan. 11, 1964, B 74,952
7 Claims. (Cl. 260—249.8)

The present invention relates to new triazine derivatives. In particular it relates to water-soluble triazine derivatives having herbicidal action.

Prior art triazine derivatives are insoluble in water. The new compounds have the advantage that they may readily be used in the form of their aqueous solutions and that they can penetrate rapidly into the plant tissue because they are soluble in water.

It is known that triazine compounds, for example agents containing 2 - isopropylamino - 4 - β - hydroxypropylamino - 6 - chloro-s-triazine, may be used for controlling undesired plant growth (U.S. patent specification No. 2,891,855). These agents have the disadvantage that they are insoluble in water and therefore accumulate in the soil; this impairs their use on agricultural land because the soil cannot be used for fresh planting of crops.

We have found that agents for controlling undesired plant growth have an excellent selective herbicidal action when they contain a reaction product of an anhydride of a dibasic carboxylic acid with a triazine having the general formula

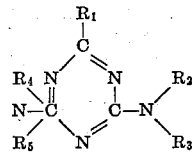

in which $R_1$ denotes chlorine, —O—methyl or —S—methyl; $R_2$ denotes hydroxyalkyl, hydroxyalkenyl or hydroxyalkynyl having two to four carbon atoms; $R_3$ denotes hydrogen, alkyl, allyl or alkynyl having one to four carbon atoms; $R_4$ denotes alkyl or alkynyl having one to four carbon atoms; or chloroalkyl having two to three carbon atoms; or ethyl bearing as substituents: —OCH$_3$, —OC$_2$H$_5$, —SCH$_3$ or —SC$_2$H$_5$; or —SCH$_3$; or alkyl having two to three carbon atoms and bearing —SH as a substituent; $R_5$ denotes hydrogen, allyl or alkyl having one to three carbon atoms, either as such or in the form of a salt. The amount to be used is from about 0.5 to about 10 kg. of active substance per hectare.

These active substances are soluble in water and disappear in the soil after use more rapidly than the prior art triazines, so that further crops may be planted earlier than when using prior art triazines.

The anhydrides of the following acids: succinic acid, glutaric acid, maleic acid and itaconic acid and also the monohalogen to tetrahalogen or alkyl derivatives of the above acids may be used for reaction for the production of the active substances. The salts envisaged include the salts of the reaction products with metals, particularly the alkali metal salts (for example sodium or potassium salts) or alkaline earth metal salts (for example magnesium or calcium salts), and also the ammonium salts and salts of organic amines, particularly the salts of hydroxyalkylamines, for example monoethanolamine or diethanolamine salts. The reaction products of the anhydrides with the triazines are probably in the form of hemiesters of the acid and the hydroxyl group ($R_2$) of the triazine.

Some of the triazines which may be used for the production of active substances to be used according to this invention are given in the following table which gives the radicals $R_1$ to $R_5$ in the above formula:

TABLE

| $R_1$ | $R_2$ | $R_3$ | $R_4$ | $R_5$ |
|---|---|---|---|---|
| Cl | β-hydroxyethyl | H | Ethyl | H |
| Cl | do | H | Propyl | H |
| Cl | do | H | Isopropyl | H |
| Cl | do | H | Butyne-(1)-yl-(3) | H |
| Cl | do | H | Butyl | H |
| Cl | do | H | β-chloroethyl | H |
| Cl | do | H | Methoxyethyl | H |
| Cl | do | H | Ethyoxethyl | H |
| Cl | do | H | Methylthioethyl | H |
| Cl | do | H | Ethylthioethyl | H |
| Cl | do | Methyl | Ethyl | H |
| Cl | do | Ethyl | do | H |
| Cl | do | Propyl | do | H |
| Cl | do | Isopropyl | do | H |
| Cl | do | Butyne-(1)-yl-(3) | do | H |
| Cl | do | H | do | Methyl |
| Cl | do | H | do | Ethyl |
| Cl | do | H | Isopropyl | Isopropyl |
| Cl | β-Hydroxybutenyl | H | do | H |
| Cl | do | H | Butyne-(1)-yl-(3) | Ethyl |
| Cl | do | H | β-Sulfhydrylethyl | H |
| Cl | do | H | δ-Sulfhydrylbutyne-(1)-yl | H |
| Cl | β-Hydroxypropyl | H | Ethyl | H |
| Cl | do | H | do | Allyl |
| Cl | do | H | Propyl | H |
| Cl | do | H | Isopropyl | H |
| Cl | do | H | do | Isopropyl |
| Cl | do | H | β-Chloroethyl | H |
| Cl | do | H | β-Chloroisopropyl | Methyl |
| Cl | do | Methyl | Methoxyethyl | H |
| Cl | do | Ethyl | Ethyl | Methyl |
| Cl | do | H | β-Sulfhydrylethyl | H |
| Cl | do | H | γ-Sulfhydrylpropyl | H |
| —OCH$_3$ | β-Hydroxyethyl | Methyl | Isopropyl | H |
| —OCH$_3$ | γ-Hydroxypropyl | H | do | H |
| —OCH$_3$ | β-Hydroxypropyl | H | Methoxyethyl | H |
| —OCH$_3$ | β-Hydroxybutyne-(3)-yl | H | Methylthioethyl | H |
| —SCH$_3$ | β-Hydroxyethyl | H | Ethyl | Methyl |
| —SCH$_3$ | do | Ethyl | β-Chloroethyl | Methyl |
| —SCH$_3$ | do | H | Ethylthioethyl | H |
| —OCH$_3$ | do | H | Isopropyl | H |
| —OCH$_3$ | do | H | do | Methyl |
| —OCH$_3$ | do | H | Propyl | H |
| —OCH$_3$ | β-Hydroxypropyl | Methyl | Methoxyethyl | H |

TABLE—Continued

| R[1] | R[2] | R[3] | R[4] | R[5] |
|---|---|---|---|---|
| —OCH$_3$ | γ-Hydroxypropyl | H | Ethyl | H |
| —OCH$_3$ | do | H | Methoxyethyl | H |
| —SCH$_3$ | β-Hydroxyethyl | Methyl | Ethyl | H |
| —SCH$_3$ | do | H | Isopropyl | H |
| —SCH$_3$ | do | H | Propyl | H |
| —SCH$_3$ | β-Hydroxypropyl | H | Ethyl | H |
| —SCH$_3$ | do | H | Isopropyl | H |
| —SCH$_3$ | do | H | Methoxyethyl | H |
| —SCH$_3$ | do | H | Methylthioethyl | H |
| —SCH$_3$ | do | H | β-Chloroethyl | H |

The following list contains some triazines which, when reacted with maleic anhydride, give compounds which may be used according to this invention and which have the chlorine contents, and in some cases the decomposition points, specified:

2-isopropylamino-4-β-hydroxypropylamino-6-chloro-s-triazine,
    Cl: found 9.85%, calculated 10.3%; decomposition point 129° C.;

2-ethylamino-4-β-hydroxypropylamino-6-chloro-s-triazine, decomposition point 75° C.;

2-isopropylamino-4-β-hydroxyethylamino-6-chloro-s-triazine,
    Cl: found 9.4%, calculated 10.1%;

2-isopropylamino-4-β-hydroxybutenylamino-6-chloro-s-triazine,
    Cl: found 10.8%, calculated 10.0%;

2-diethylamino-4-β-hydroxypropylamino-6-chloro-s-triazine,
    Cl: found 10.15%, calculated 9.93%;

2-ethylamino-4-β-hydroxyethylamino-6-chloro-s-triazine,
    Cl: found 11.6%, calculated 11.3%; decomposition point 115° C.;

2-ethylamino-4-(N-ethyl-N-β-hydroxyethyl)-amino-6-chloro-s-triazine,
    Cl: found 10.30%, calculated 10.40%;

2-isopropylamino-4-γ-hydroxypropylamino-6-chloro-s-triazine,
    Cl: found 11.0%, calculated 10.35%, decomposition point 144° C.;

2-isopropylamino-4-γ-hydroxypropylamino-6-chloro-s-triazine, 2-hydroxyethylamine salt (hygroscopic powder),
    Cl: found 9.2%, calculated 8.8%.

Reaction of the dibasic acids with the triazines may be carried out in inert dry solvents, for example benzene, toluene or dioxane. For reaction with the triazines, the acid anhydride in the form of a solution is placed in a reactor, the triazine is introduced while stirring and the temperature is kept higher than 50° C. until the triazine has passed slowly into solution. Water or alcohol is then added and neutralization is effected with sodium carbonate, sodium bicarbonate, potassium carbonate, alkaline earth metal hydroxides or amines, for example ethanolamine. The solvent or diluent is then distilled off at subatmospheric pressure. The metal salts are usually solid products. They are usually soluble in water, particularly the alkali metal salts, and may be used alone in the form of aqueous solutions. It is, however, also possible to use mixtures which have been prepared from different substituted triazines and carboxylic anhydrides. Other herbicides, for example inorganic salts (borates) or urea derivatives, carbamates, uracils or anilides, may also be added to the active substances prior to use.

The plant growth control agents according to this invention are usually prepared by mixing the active substances with conventional extenders. Solution in water is included.

Examples of solid or liquid carriers are fertilizers, inert solid carriers, talc, diatomaceous earth, water, organic liquids, xylene, petroleum distillates or synthetic organic liquids.

The following examples illustrate the use of the plant growth control agents according to the invention.

Example 1

Barley (*Hordeum vulgare*), rice (*Oryza sativa*), mustard (*Sinapis alba*), wild foxtail (*Alopecurus myosuroides*), wild oats (*Avena fatua*) and a mixture of weeds consisting of sorrel (*Rumex acetosa*), ribwort plantain (*Plantago lanceolata*), amaranth (*Amaranthus retroflexus*) and white goosefoot (*Chenopodium album*) are sown in plastic pots in a greenhouse and on the same day the surface of the soil in the pots is treated with an aqueous solution of the sodium salt of the reaction product of 2-isopropylamino-4-β-hydroxypropylamino-6-chloro-s-triazine and maleic anhydride at a rate equivalent to the use of 1 kg. of active substance per hectare dissolved in 600 liters of water per hectare. Three weeks later it is found that the weed mixture and the mustard have completely withered. Wild oats and wild foxtail are damaged to the extent of 70%. Rice and barley show normal growth.

During the whole duration of the experiment, the soil in the pots has 3 mm. of water a day applied to it from the day of the sowing. Ten weeks later, rice, barley and mustard are again sown in the pots in which the plants died. The plants germinate several days later and show no inhibition of growth then or later.

The reaction products of 2-isopropylamino-4-β-hydroxyethylamino-6-chloro-s-triazine and succinic anhydride, 2-ethylamino-4-β-hydroxypropylamino-6 - chloro-s-triazine and monochloromaleic anhydride and the potassium salt of this reaction product. 2-ethylamino-4-β-hydroxybuten-(3)-yl-amino-6-chloro-s-triazine and maleic anhydride and the sodium salt of this reaction product, 2-isopropylamino-4-methyl-β-hydroxyethylamino - 6 - chloro-s-triazine and maleic anhydride and the ethanolamine salt of this reaction product, have a similar action to the sodium salt of the reaction product of 2-isopropylamino-4-β-hydroxypropylamino-6-chloro-s-triazine and maleic anhydride.

Barley (*Hordeum vulgare*), rice (*Oryza sativa*), annual grasses and a mixture of weeds consisting of sorrel (*Rumex acetosa*), chickweed (*Stellaria media*), tufted vetch (*Vicia cracca*), ribwort plantain (*Plantago lanceolata*), white goosefoot (*Chenopodium album*), amaranth (*Amaranthus retroflexus*) are sprayed in a greenhouse at an average height of the plants of 5 to 15 cm. with aqueous solutions of the following active substances at rates equivalent to the use of 2.5 or 4 kg. of active substance per hectare and 600 liters of water per hectare: sodium salt of the reaction product of 2-isopropylamino-4-β-hydroxypropylamino-6-chloro-s-triazine and maleic anhydride (I) and a reaction product of 2-isopropylamino-4-β-hydroxypropylamino-6-chloro-s-triazine with maleic anhydride (II) in comparison with an aqueous dispersion of 2-isopropylamino-4-β-hydroxypropylamino-6-chloro-s-triazine (III). Fourteen days after the treatment it is found that active substances I and II have a much more favorable plant compatibility than active substance III, particularly for rice (*Oryza sativa*) and barley (*Hordeum vulgare*). The active substances have practically the same effect on the weeds as may be seen from the following table.

TABLE

| Amount of active substance used, kg./ha. | Crops | | Undesired plants | |
|---|---|---|---|---|
| | Barley | Rice | Annual grasses | Weed mixture |
| I, 2.5 | 0– 10 | 0 | 70– 80 | 95–100 |
| I, 4 | 10 | 0– 5 | 80–100 | 95–100 |
| II, 2.5 | 0– 10 | 0 | 70– 80 | 95–100 |
| II, 4 | 5– 15 | 0 | 80–100 | 95–100 |
| III, 2.5 | 40–100 | 40 | 70 | 80– 90 |
| III, 4 | 60– 70 | 50–60 | 80–90 | 95–100 |

The reaction product of 2-ethylamino-4-β-hydroxybuten-(3)-yl-amino-6-chloro-s-triazine and maleic anhydride and the sodium salt of the said reaction product have similar action to active substances I and II.

Example 3

The plants: rice (*Oryza sativa*), Indian corn (*Zea mays*), panic grass (Panicum spp.) and a mixture of weeds consisting of sorrel (Rumex spp.), mustard (*Sinapis alba*), small nettle (*Urtica urens*) and white goosefoot (*Chenopodium album*) are sprayed in the greenhouse at a growth height of 4 to 16 cm. with an aqueous solution of the sodium salt of the reaction product of 2-ethylamino-4-β-hydroxyethylamino - 6 - methylthio-s-triazine and maleic anhydride (I), an aqueous solution of the sodium salt of the reaction product of 2-isopropylamino-4-β-hydroxyethylamino-6 - methylthio-s-triazine and maleic anhydride (II) and, for comparison therewith, 2-chloro-4,6-bis-(ethylamino)-s-triazine (III) and 2-chloro-4-ethylamino-6-isopropylamino-s-triazine (IV). The rate of application in each case corresponds to 1.0 kg./ha. of active substance dispersed in 500 liters of water. Three weeks later it is found that compounds I and II have a much more rapid and stronger action on panic grass (Panicum spp.) and a better plant compatibility with rice (*Oryza sativa*) than the compounds III and IV. The results of the experiment may be seen from the following table:

TABLE

| Active substance | Crops | | Unwanted plants | |
|---|---|---|---|---|
| | Rice | Indian corn | Panic grass | Weed mixture |
| I | 10 | 0 | 100 | 90–100 |
| II | 10–15 | 0 | 90–100 | 80–100 |
| III | 60–80 | 0 | 10 | 90–100 |
| IV | 60–70 | 0 | 10–20 | 90–100 |

Moreover compounds I and II have the advantage over compounds III and IV that they are soluble in water so that these substances have only very slight residual action in the soil.

The condensation product of maleic anhydride and 2-ethylamino-4-β-hydroxyethylamino-6-methylthio - s-triazine is solid and strongly hygroscopic.

*Titer.*—Found: 2.85. Calculated: 3.05 ml. of N-alkali metal hydroxide solution.

The condensation product of maleic anhydride and 2-isopropylamino-4-β - hydroxyethylamino-6-methylthio-s-triazine has a decomposition point of 55° C.

*Titer.*—Found: 2.95. Calculated 2.93 ml. of N-alkali metal hydroxide solution.

We claim:
1. A compound selected from the group consisting of
(a) the hemiesters of a dibasic carboxylic acid selected from the group consisting of succinic acid, glutaric acid, maleic acid, itaconic acid, and said acids having chloro or lower alkyl substituent groups and a hydroxy-substituted triazine of the formula

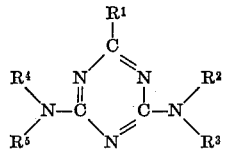

wherein
$R^1$ is a member selected from the group consisting of —Cl, —OCH$_3$ and —SCH$_3$,
$R^2$ is a member selected from the group consisting of hydroxyalkyl of 2 to 4 carbon atoms, and hydroxyalkenyl and hydroxyalkynyl of 3 to 4 carbon atoms,
$R^3$ is a member selected from the group consisting of hydrogen, allyl and alkyl of 1 to 4 carbon atoms, and alkynyl of 2 to 4 carbon atoms,
$R^4$ is a member selected from the group consisting of alkyl of 1 to 4 carbon atoms, alkynyl of 2 to 4 carbon atoms, chloroalkyl of 2 to 3 carbon atoms, ethyl substituted by a radical selected from the group consisting of —OCH$_3$, —OC$_2$H$_5$, —SCH$_3$ and —SC$_2$H$_5$, the radical —SCH$_3$ and alkyl of 2 to 3 carbon atoms substituted by the radical —SH, and
$R^5$ is a member selected from the group consisting of hydrogen, allyl and alkyl of 1 to 3 carbon atoms; and
(b) water-soluble salts of said hemiesters.

2. A product as claimed in claim 1 wherein said dibasic carboxylic acid is maleic acid.
3. A product as claimed in claim 1 wherein said dibasic carboxylic acid is succinic acid.
4. A product as claimed in claim 1 which is the hemiester of 2-isopropylamino-4-β-hydroxypropylamino-6-chloro-s-triazine and maleic acid.
5. A product as claimed in claim 1 which is the sodium salt of the hemiester of 2-isopropylamino-4-β-hydroxypropylamino-6-chloro-s-triazine and maleic acid.
6. A product as claimed in claim 1 which is the hemiester of 2-ethylamino-4-β-hydroxyethylamino-6 - methylthio-s-triazine and maleic acid.
7. A product as claimed in claim 1 which is the hemiester of 2-isopropylamino-4-β-hydroxyethylamino-6-methylthio-s-triazine and maleic acid.

References Cited
UNITED STATES PATENTS 2,496,097 1/1950 Kropa _____ 260—249.8 XR
3,022,150 2/1962 Weed _____ 260—249.8 XR
3,257,192 6/1966 Luckenbaugh et al. __ 260—249.8

WALTER A. MODANCE, *Primary Examiner.*

J. M. FORD, *Assistance Examiner.*

UNITED STATES PATENT OFFICE
CERTIFICATE OF CORRECTION

Patent No. 3,346,576                                October 10, 1967

Gustav Steinbrunn et al.

It is hereby certified that error appears in the above numbered patent requiring correction and that the said Letters Patent should read as corrected below.

Column 3, line 42, for "10.35%" read -- 10.33% --; column 4, after line 52, insert -- Example 2 --, in italics; line 56, for "ribowort" read -- ribwort --; column 5, line 58, for "ethylatmino" read -- ethylamino --.

Signed and sealed this 4th day of February 1969.

(SEAL)
Attest:

Edward M. Fletcher, Jr.                              EDWARD J. BRENNER
Attesting Officer                                          Commissioner of Patents